United States Patent
Ito

(10) Patent No.: US 7,787,603 B2
(45) Date of Patent: Aug. 31, 2010

(54) TELEPHONE APPARATUS AND PROGRAM PRODUCT

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1120 days.

(21) Appl. No.: 11/429,104

(22) Filed: May 8, 2006

(65) Prior Publication Data

US 2006/0256395 A1 Nov. 16, 2006

(30) Foreign Application Priority Data

May 10, 2005 (JP) ............... 2005-137452

(51) Int. Cl.
H04M 11/00 (2006.01)
(52) U.S. Cl. .............. 379/93.23; 379/100.01
(58) Field of Classification Search .......... 379/93.23, 379/100.01, 100.16
See application file for complete search history.

(56) References Cited

U.S. PATENT DOCUMENTS

| 5,799,074 A | 8/1998 | Mano et al. |
| 5,867,567 A | 2/1999 | Itoh |
| 2002/0176119 A1* | 11/2002 | Ouchi .................. 358/448 |

FOREIGN PATENT DOCUMENTS

| EP | 0 573 721 A1 | 12/1993 |
| JP | 6-62140 A | 3/1994 |
| JP | 7-203006 | 8/1995 |
| JP | 8-331359 | 12/1996 |
| JP | 9-270870 A | 10/1997 |
| JP | 2000-236399 | 8/2000 |
| JP | 2001-177666 A | 6/2001 |

OTHER PUBLICATIONS

Japanese Office Action, with English translation, issued in corresponding Japanese Patent Application No. 2005-137452 mailed on Oct. 2, 2007.
Japanese Office Action, with partial English translation, issued in Japanese Patent Application No. JP 2005-137452, mailed Sep. 2, 2008.

* cited by examiner

Primary Examiner—Stella L Woo
(74) Attorney, Agent, or Firm—Baker Botts, L.L.P.

(57) ABSTRACT

A telephone apparatus includes: a call signal detecting unit that detects a call signal transmitted via a public telephone line; an identification information detecting unit that detects source identification information transmitted via the public telephone line; and a source identification information detection control unit that controls an operation of the identification information detecting unit. The source identification information detection control unit actuates the identification information detecting unit when the call signal detecting unit detects the call signal and a predetermined condition is satisfied, and stops or does not actuate the identification information detecting unit when the call signal detecting unit detects the call signal and the predetermined condition is not satisfied.

9 Claims, 12 Drawing Sheets

TELEPHONE APPARATUS AND PROGRAM PRODUCT

CROSS REFERENCE TO RELATED APPLICATION

This application claims priority from Japanese Patent Application No. 2005-137452, filed on May 10, 2005, the entire subject matter of which is incorporated herein by reference.

TECHNICAL FIELD

Aspects of the present invention relate to a telephone apparatus adapted to transmit source identification information, such as a caller's telephone number, in an interval of call signals. The apparatus may be applicable to a multifunction facsimile apparatus added with a printer function and a scanner function, etc., in addition to a facsimile function.

BACKGROUND

In a telephone apparatus adapted to include, for example, a number display service for displaying source identification information or the like, a detecting sequence for detecting information (signal) indicating a caller's telephone number transmitted from a switchboard is actuated. The detected caller's telephone number is displayed on a display part provided on the telephone apparatus (for example, refer to JP-A-2001-177666).

SUMMARY

Aspects of the present invention detect source identification information regardless of the type of the switchboard.

DETAILED DESCRIPTION

According to an aspect of the invention there is provided a telephone apparatus including: a call signal detecting unit that detects a call signal transmitted via a public telephone line; an identification information detecting unit that detects source identification information transmitted via the public telephone line; and a source identification information detection control unit that controls an operation of the identification information detecting unit, wherein the source identification information detection control unit actuates the identification information detecting unit when the call signal detecting unit detects the call signal and a predetermined condition is satisfied, and the source identification information detection control unit stops or does not actuate the identification information detecting unit when the call signal detecting unit detects the call signal and the predetermined condition is not satisfied.

When a signal transmitted first from the switchboard has been detected as a call signal, that is, even when source identification information is not transmitted thereafter and source identification information is transmitted after a signal detected as a second or later call signal, the identification information detecting unit is actuated if the predetermined condition is satisfied. Therefore, even when the source identification information is transmitted after the signal detected as a second or later call signal, the source identification information can be detected.

In addition, even when the duration of the call signal transmitted first from the switchboard is, for example, less than 500 milliseconds or the frequency of the call signal transmitted first from the switchboard is different from 16 Hz and the telephone apparatus cannot detect the first call signal, if the predetermined condition is satisfied and source identification information is transmitted following the second or later call signal, the source identification information can be detected. Therefore, even when the first call signal cannot be detected, the source identification information can be detected.

Therefore, according to the aspect of the invention, source identification information can be detected regardless of the type of the switchboard.

Hereinafter, aspects of the invention will be described with reference to the accompanying drawings.

(First Aspect)

Figure 1:
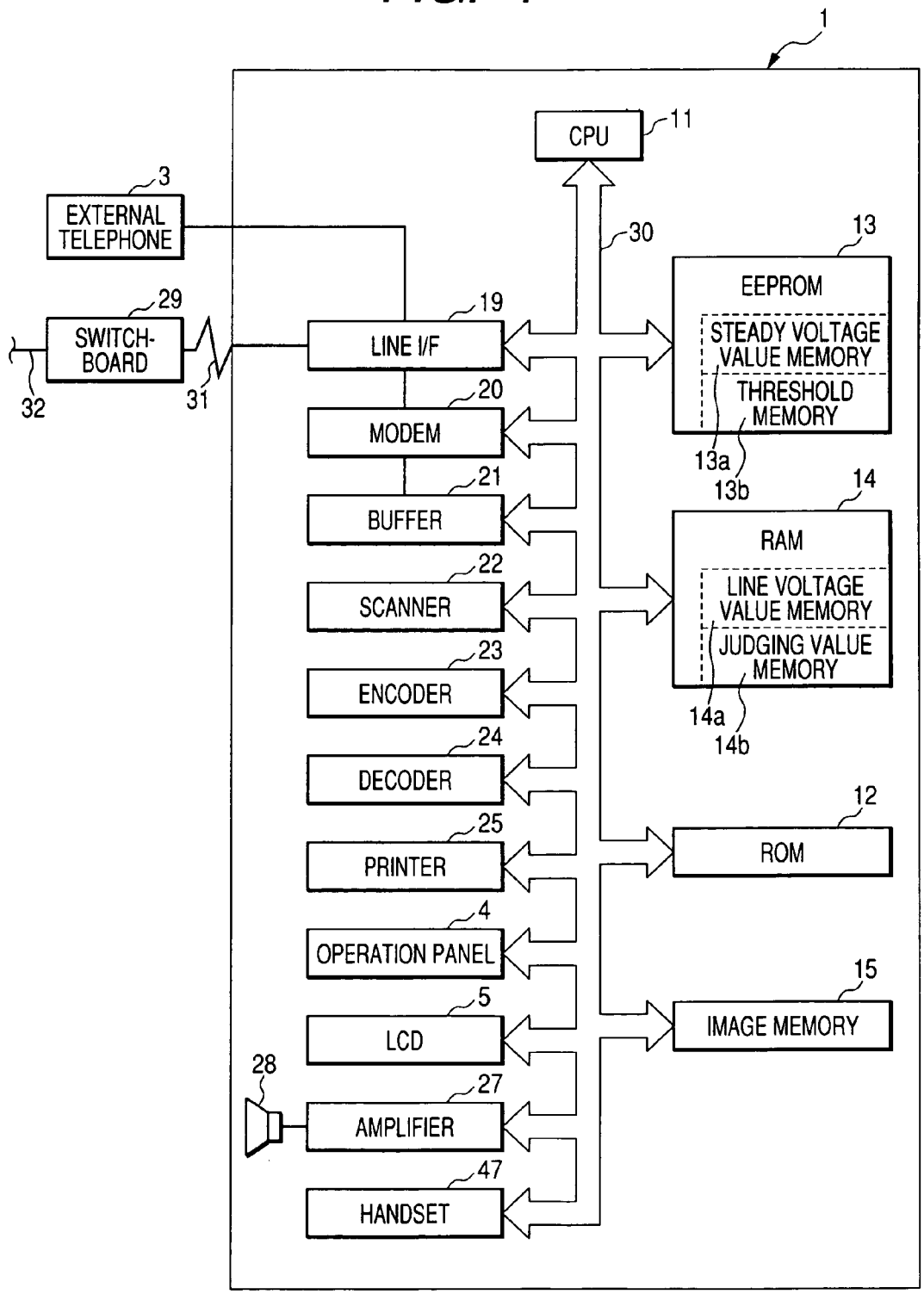
FIG. 1 is a block diagram showing an electrical construction of a facsimile apparatus according to a first aspect of the invention.
Figure 2:
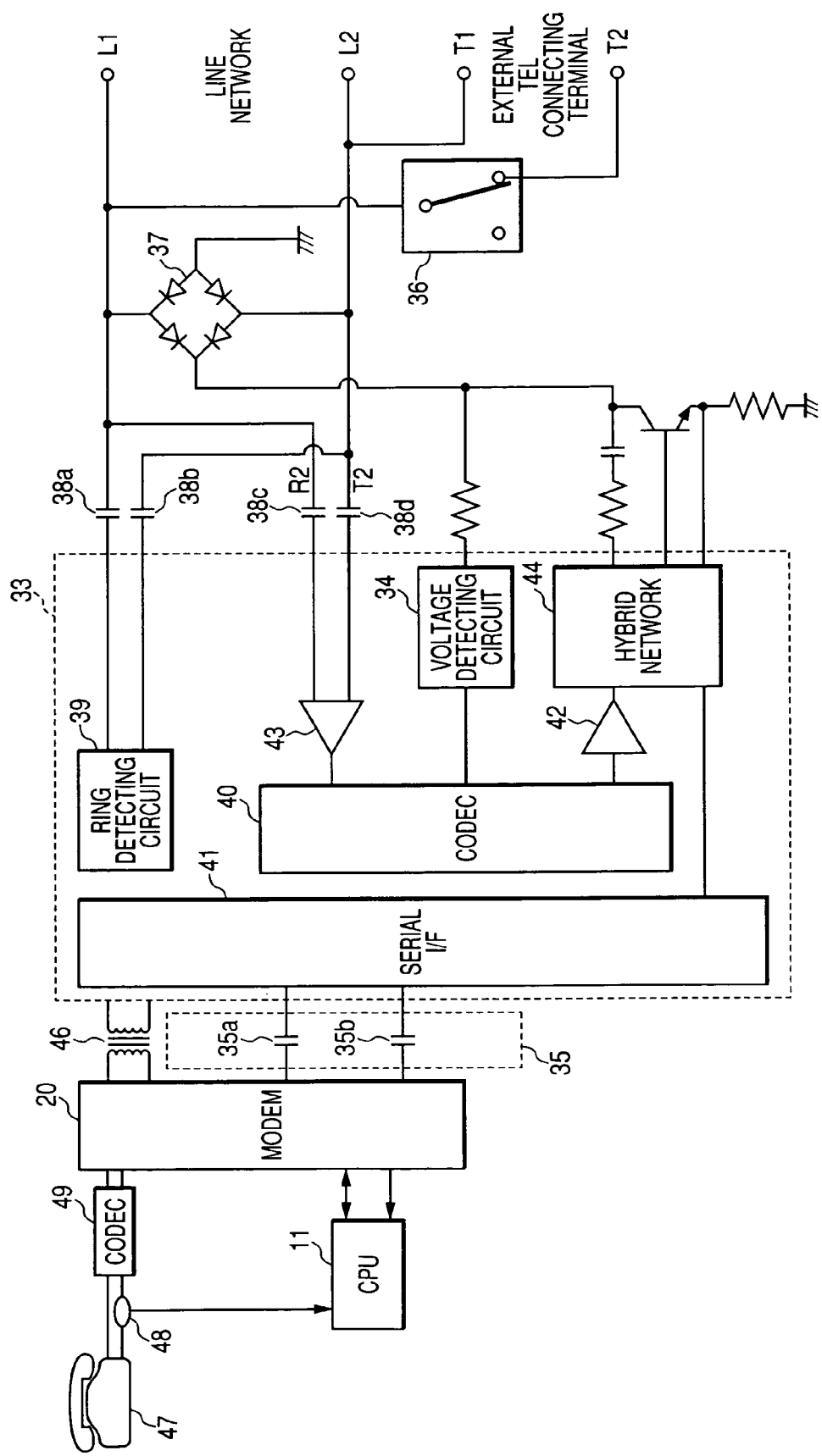
FIG. 2 is a block diagram of a line I/F of the facsimile apparatus according to the first aspect of the invention.

A first aspect relates to a multifunction facsimile apparatus added with a printer function and a scanner function, etc., to which a telephone apparatus is applied. FIG. 1 is a block diagram of an electrical construction of a facsimile apparatus 1 according to the aspect of the invention, and FIG. 2 is a block diagram of a line I/F 19.

1. Overview of Facsimile Apparatus 1

The facsimile apparatus 1 is provided with, as shown in FIG. 1, a facsimile circuit including a CPU 11, a ROM 12, an EEPROM 13, a RAM 14, an image memory 15, a line I/F 19, a modem 20, a buffer 21, a scanner 22, an encoder 23, and a decoder 24. Also, a printer 25, an operation panel 4, an LCD (liquid crystal display panel) 5, an amplifier 27, and a handset 47 for conversation are provided. These are connected to each other via a bus line 30.

The LCD 5 displays various information by means of characters and images to a user based on an instruction signal from the CPU 11. The information includes, for example, information that an external telephone 3 connected to the public telephone line 32 parallel to the facsimile circuit is busy, information that FAX data is being transmitted or received, and information on a source such as a telephone number or facsimile number of a source or a name or appellation of a source, and so on.

The line I/F 19 is for line control. As shown in FIG. 2, the line I/F 19 has a semiconductor DAA (Dynamic Address Assignment) 33. The line I/F 19 receives various signals such as a call signal (ring signal) transmitted from the switchboard 29 and a signal indicating source identification information (hereinafter, source identification information will be referred to as caller ID) such as a telephone number of the other end apparatus and transmits a dial signal when dialing according to a key operation on the operation panel 4.

The line I/F 19 is provided with external telephone terminals T1 and T2 for connecting the external telephone 3 to the public telephone line 32 parallel to the facsimile circuit. The facsimile apparatus 1 (facsimile circuit) and the external telephone 3 are connected to the telephone line 31 via this line I/F 19.

The CPU 11 constitutes a computer that controls the respective units connected by the busline 30 according to various signals transmitted or received via the line I/F 19 and executes a facsimile operation, that is, transmission and reception (data communications), etc. of image data or the like. The ROM 12 is a non-rewritable storage device storing control programs, etc., to be executed in this facsimile apparatus 1, and this ROM 12 stores a program for executing the flowchart shown in FIG. 3 through FIG. 11.

The RAM 14 is a readable and rewritable storage device for storing various data and call registers when executing the operations of the facsimile apparatus 1. This RAM 14 includes a line voltage value memory 14a and a judging value memory 14b, etc.

The line voltage value memory 14a is a memory for storing a voltage value to be supplied to the semiconductor DAA 33 when the telephone line 31 is disconnected, that is, when a DC circuit for controlling a line network in the semiconductor DAA 33 is disconnected. This line voltage value memory 14a stores voltage values detected by a voltage detecting circuit 34 (see FIG. 2) when the telephone line 31 is disconnected in the order of detection. Incidentally, the voltage detecting circuit 34 constitutes a voltage detecting unit that detects a line voltage of the public telephone line 32.

The line voltage memory according to this aspect can store a plurality (for example, ten) of voltage values. The plurality of voltage values stored in the line voltage value memory 14a are erased from the line voltage value memory 14a after the mean value of the stored voltage values is calculated. The calculated mean value of the voltage values is stored as a standby voltage value Vr in a steady state in a steady voltage value memory 13a described later.

The judging value memory 14b is a memory for storing a judging voltage Vt as a judging reference value for judging whether the external telephone 3 is in a hook-up state or a hook-down state. This judging voltage Vt is smaller than the reference voltage of the line voltage when the telephone line 31 is disconnected and has a predetermined voltage difference of ΔV or more from the reference voltage. In this aspect, as the reference voltage, the standby voltage value Vr is used.

Incidentally, the hook-up state of the external telephone 3 means a state in which the external telephone 3 connects the public telephone line 32 (on-hook state). The hook-down state of the external telephone 3 means a state in which the external telephone 3 disconnects the public telephone line 32 (off-hook state).

As shown in FIG. 1, the EEPROM 13 includes a steady voltage value memory 13a and a threshold memory 13b, etc., and is a rewritable nonvolatile storage device that can retain written (stored) data even after the power source of the facsimile apparatus 1 is turned off.

The steady voltage value memory 13a is a memory for storing the standby voltage value Vr as the mean value of ten voltage values stored in the line voltage value memory 14a. When ten voltage values are stored in the line voltage value memory 14a, the steady voltage value memory 13a is updated with the mean value calculated from the ten voltage values, so that it is periodically updated during the disconnected state of the telephone line 31.

The threshold memory 13b is a storage device for storing a coefficient Ct (for example, 0.5) for calculation of the judging voltage Vt for judging the hook-up state of the external telephone 3. Namely, in the aspect, the judging voltage Vt is calculated by multiplying the standby voltage value Vr, stored in the steady voltage value memory 13a by the coefficient Ct, stored in the threshold memory 13b and then stored in the judging value memory 14b. Incidentally, in this aspect, the coefficient Ct to be stored in the threshold memory 13b can be changed by an operation on the operation panel 4 by a user or service personnel.

The image memory 15 is a storage device for storing image data and bit images for printing, and includes a dynamic RAM (DRAM) that is an inexpensive high-capacity memory. Received image data is temporarily stored in the image memory 15, printed on a recording sheet by the printer 25, and then erased from the image memory 15. Image data read by the scanner 22 is also stored in this image memory 15.

The modem 20 modulates and demodulates image information and communication data and transmits these and transmits and receives various procedure signals for transmission control. The buffer 21 temporarily stores data including encoded image information to be transmitted to or received from the other end apparatus.

The scanner 22 reads an original inserted in an original insertion opening as image data and has an original feed motor. The encoder 23 encodes the image data read by the scanner 22.

The decoder 24 reads the image data stored in the buffer 21 or the image memory 15 and decodes this data, and the decoded data is printed on a recording sheet by the printer 25. The amplifier 27 outputs a ring tone and voices by sounding the speaker 28 connected to the amplifier 27.

Incidentally, the printer 25 in this aspect is a known ink-jet printer including a recording sheet feed motor for feeding recording sheets, a carriage motor for moving a carriage including a print head, and the print head for ejecting ink on a recording sheet, etc.

The handset 47 is a handset for conversation including a speaker to reproduce transmitted voice signals and a microphone to pick-up voices from the conversation party. The speaker and the microphone are integrated together. This handset 47 or the facsimile apparatus main body is provided with, as shown in FIG. 2, a hook switch 48 serving as a hook state detecting unit that detects whether the handset 47 has been lifted. When the handset 47 is lifted, that is, when the handset 47 is hooked up, an ON signal is inputted from the hook switch 48 into the CPU 11.

"The handset 47 is lifted" means that a user tried to make conversation by using the handset 47, including the case where a conversation start switch as in a cell phone has been operated in addition to the case where the handset 47 has been actually lifted from the facsimile apparatus main body.

The facsimile apparatus 1 thus constructed is connected to the telephone line 31 via the line I/F 19. This telephone line 31 is connected to the switchboard 29 of this facsimile apparatus 1. This switchboard 29 is connected to the public telephone line 32.

The semiconductor DAA 33 functions as a line terminal, a hybrid network, and a ring detector, etc., as shown in FIG. 2. An insulator 35 that insulates the semiconductor DAA 33 and the modem 20 in a direct current flow manner and transmits data and signals is interposed between the semiconductor DAA 33 and the modem 20.

In the line I/F 19, as components other than the semiconductor DAA 33, a connect MODEM-to-Line relay 36 (hereinafter, referred to as CML relay 36), a rectifier 37, direct current loop cutting capacitors 38a, 38b, 38c, and 38d, etc. are provided for switching between TEL (voice communication) and FAX (image communication). L1 and L2 denote terminals to the telephone line 31 side, and T1 and T2 denote terminals to the external telephone 3 side.

Incidentally, since the CODEC 40 that performs A/D conversion and D/A conversion of FAX data is provided in the semiconductor DAA 33, the digital transmission is performed in the insulator 35. Therefore, in the aspect, for the insulator 35, high-insulation capacitors 35a and 35b are used.

The CML relay 36 is connected to the external telephone 3 side at the time of standby as shown in FIG. 2. When FAX communication starts, to prevent crosstalk, the CPU 11 turns the CML relay control signal off and disconnects the external telephone 3 from the public telephone line 32.

The rectifier 37 rectifies the polarity of the DC loop current of the line network to one direction. The power of the semiconductor DAA 33 is supplied from the modem 20 side through the transformer 46 and rectified by the rectifier 37 to a voltage with a constant polarity regardless of the voltage polarity of the telephone line 31.

The voltage detecting circuit 34 detects a voltage that is rectified by the rectifier 37 and supplied to the semiconductor DAA 33. The voltage detecting circuit 34 is connected to, as shown in FIG. 2, a connect line that connects the rectifier 37 and the hybrid network 44, and the CODEC 40. The results of detection by the voltage detecting circuit 34 are outputted from the semiconductor DAA 33 to the CPU 11 via the modem 20.

The hybrid network 44 is for disconnecting and connecting the line network. The hybrid network 44 includes a two-wire/four-wire converting circuit that separates FAX data from the telephone line 31 into transmitting or receiving data, a canceller circuit that restrains sneak of transmitting data to a receiving path, and a filter circuit. The line network, the CODEC 40, the serial I/F 41, and a ground are connected to this hybrid network 44. Between the hybrid network and the CODEC 40, a transmission amplifier 42 is interposed.

The CODEC 40 performs A/D conversion and D/A conversion of FAX receiving data and transmitting data. The line network, the external telephone 3, the hybrid network 44, and the serial I/F 41 are connected to the CODEC 40 via the transmission amplifier 42 or a tone amplifier 43.

The transmission amplifier 42 is for adjusting the gain of the transmitting data. The tone amplifier 43 is a differential amplifier and allows differential input of the terminals L1 and L2 of the telephone line 31.

When a tone signal arrives at the CODEC 40 from the telephone line 31 or the external telephone 3, the tone signal flows to the tone amplifier 43, the CODEC 40, the serial I/F 41, the insulator 35, and the modem 20 in this order. A tone detection signal transmitted from the CODEC 40 is detected by the CPU 11.

The ring detecting circuit 39 is connected to the line network, the external telephone 3, and the serial I/F 41. When a call signal (ring signal) arrives at the ring detecting circuit 39 from the telephone line 31, in the same cycle, a ring detection signal passes through the ring detecting circuit 39, the serial I/F 41, and the capacitor a of the insulator 35 in order. When the ring detection signal changes to H (high level) from L (low level) (or vice versa), it is detected by the CPU 11 via the modem 20.

The transistor 45 is for adjusting an apparent resistance of the semiconductor DAA 33 by changing the base potential so that the line voltage to be detected by the voltage detecting circuit 34 when the line is connected becomes predetermined voltage current characteristics.

The serial I/F 41 separates a serial signal from the capacitor 35a of the insulator 35 for a control signal for making the semiconductor DAA 33 to connect and disconnect the telephone line 31 and FAX transmitting data to the CODEC 40, respectively, while unifying signals such as a ring detection signal from the ring detecting circuit 39 and FAX receiving data from the CODEC 40 into serial data for the capacitor 35b of the insulator 35.

The CODEC 49 is for performing A/D conversion and D/A conversion between the handset 47 and the modem 20 when conversation is made by using the handset 47.

2. Caller ID Detection Control

Next, caller ID detection control that is a characteristic control operation of the facsimile apparatus 1 of the aspect will be described. The following control flow is executed by the CPU 11.

2.1 Overview of Caller ID Detection Control

Figure 3:
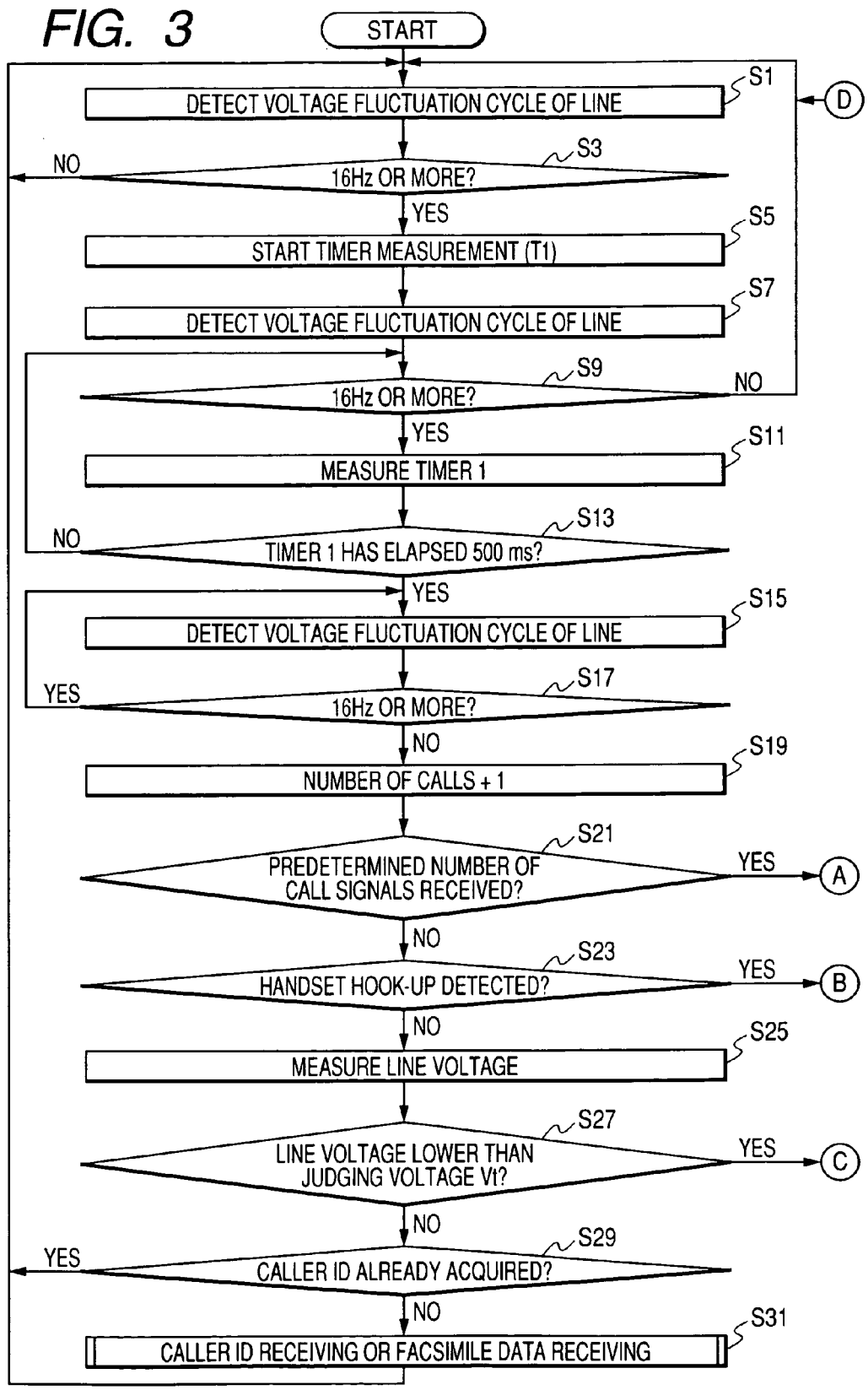
FIG. 3 is a flowchart showing characteristic operations of the facsimile apparatus according to the first aspect of the invention.

FIG. 3 through FIG. 6 are flowcharts showing the overview of the caller ID detection control. When the power source of the facsimile apparatus 1 is turned on, the control flow shown in the flowcharts of FIG. 3 through FIG. 6 are executed. First, as shown in FIG. 3, the line voltage fluctuation cycle T of the public telephone line 32 is detected (S1).

The reason for detection of the line voltage fluctuation cycle T herein is that the call signal is normally composed of a square wave with a predetermined frequency continuing for a predetermined time or more as regulated by "31 (2) of Industrial Telecommunication Equipment Rules". It can be detected whether a call signal has been outputted from the switchboard 29 by detecting the line voltage fluctuation cycle T.

Next, it is judged whether the frequency of the detected line voltage fluctuation cycle T is equal to or more than a predetermined frequency (in this aspect, 16 Hz) (S3). When it is judged that the detected line voltage fluctuation cycle T is less than the predetermined frequency (S3: NO), the process returns to S1 and a line voltage fluctuation cycle T is detected again.

On the other hand, when it is judged that the line voltage fluctuation cycle T detected at S1 is equal to or more than the predetermined frequency (S3: YES), it is highly possible that the detected signal is a call signal. Thus, time measurement with a built-in timer (hereinafter, this time is referred to as a call signal transmitting time T1) is started (S5) and a line voltage fluctuation cycle T is measured again (S7).

Next, it is judged whether the line voltage fluctuation of the line voltage fluctuation cycle T has elapsed a predetermined time (500 milliseconds in this aspect) or more, (S9 through S13). In detail, it is judged whether the line voltage fluctuation cycle T is equal to or more than the predetermined frequency (S9). When it is judged that the line voltage fluctuation cycle T is equal to or more than a predetermined frequency, the call signal transmitting time T1 that has been measured from S5 is acquired (S1), and it is judged whether the acquired call signal transmitting time T1 has exceeded the predetermined time (S13).

Then, when the line voltage fluctuation cycle T of the predetermined frequency has elapsed the predetermined time (S13: YES), that is, when a signal that can be regarded as a call signal is received, it is judged whether the currently detected call signal has been finished (S15, S17). Specifically, when the line voltage fluctuation cycle T of the predetermined frequency has elapsed the predetermined time (S13: YES), the line voltage fluctuation cycle T is detected again (S15), and it is judged whether the detected line voltage fluctuation cycle T is equal to or more than the predetermined frequency (S17).

Then, when it is judged that the line voltage fluctuation cycle T detected at S15 is equal to or more than the predetermined frequency (S17: YES), it can be regarded that the call signal has not been finished yet, so that the process returns to S15 and the line voltage fluctuation cycle T is detected again.

On the other hand, when it is judged that the line voltage fluctuation cycle T detected at S15 is less than the predetermined frequency (S17: NO), it can be regarded that the call signal has been finished. Thus, the number of call signals stored in the RAM 14 is incremented by one (S19), and it is judged whether the number of call signals stored in the RAM 14 has been equal to or more than a predetermined number (four in this aspect) (S21).

Then, when it is judged that the number of call signals stored in the RAM is less than the predetermined number (S21: NO), it is judged that the handset 47 is hooked up based on a detection signal of the hook switch 48 (S23). When it is judged that the handset 47 is not hooked up (S23: NO), the line voltage of the public telephone line 32 is detected (S25).

Next, it is judged whether the detected line voltage (hereinafter, this line voltage is referred to as a detected line voltage Vc) is lower than the judging voltage Vt (S27). When it is judged that the detected line voltage Vc is equal to or more than the judging voltage Vt (S27: NO), that is, when the external telephone 3 can be regarded as being in a hook down state, it is judged whether caller ID has already been acquired (S29). The judgment as to whether caller ID has been acquired is made based on whether the caller ID has already been stored in the RAM 14.

Then, when it is judged that the caller ID has already been acquired (S29: YES), the process returns to S1. On the other hand, when it is judged that caller ID has not been acquired yet (S29: NO), processing for acquisition of caller ID and facsimile data reception or conversation is executed (S31). The details of the processing for acquisition of caller ID and facsimile data receptor or conversation will be described later.

Figure 4:
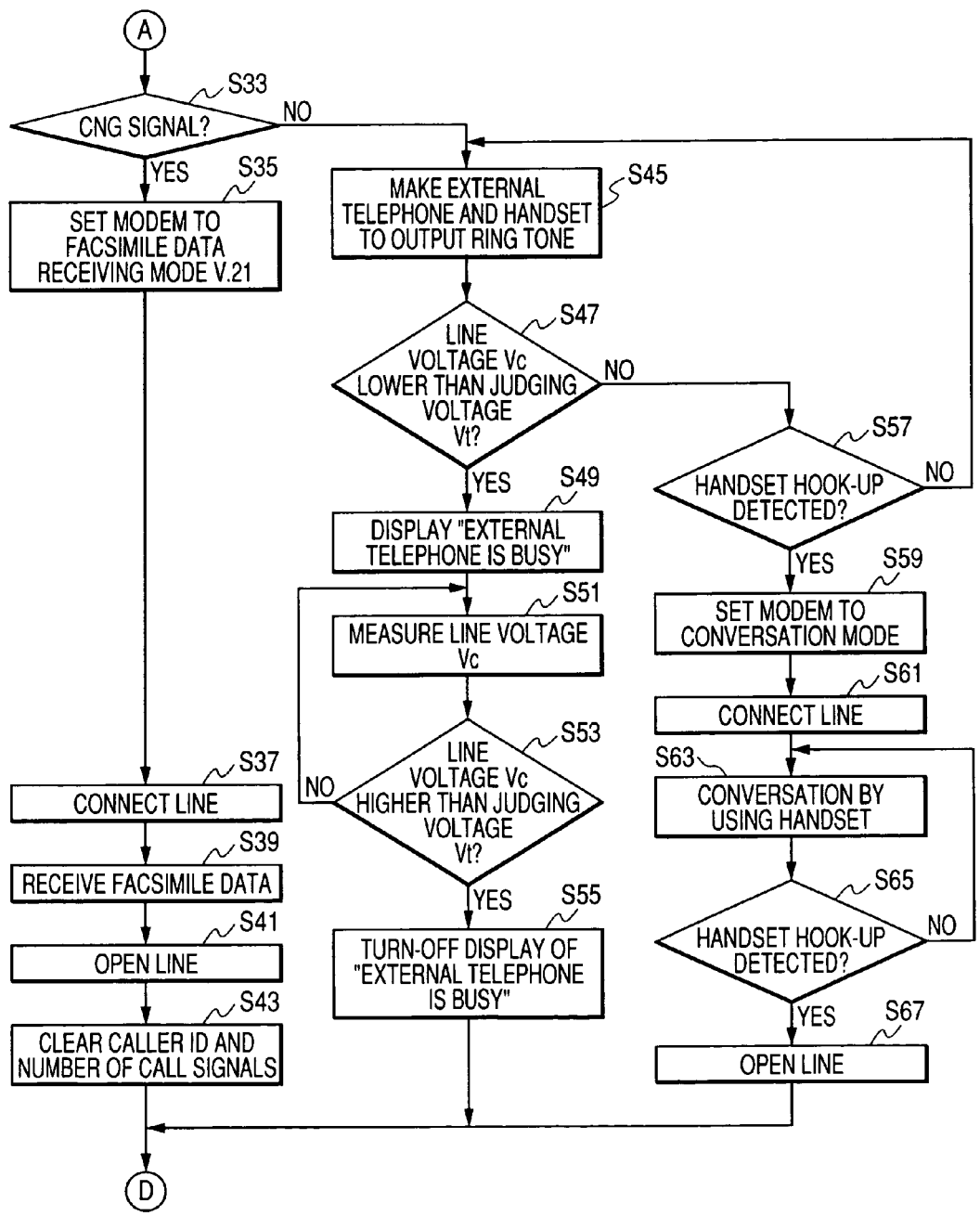
FIG. 4 is a flowchart showing characteristic operations of the facsimile apparatus according to the first aspect of the invention.

When it is judged that the number of call signals is judged as equal to or more than the predetermined number at S21 (S21: YES), as shown in FIG. 4, it is judged whether the transmitted signal is a voice data signal indicating facsimile data (hereinafter, referred to as CNG signal) (S33).

At this time, when it is judged that the transmitted signal is a CNG signal (S33: YES), the setting of the modem 20 is set to a facsimile data receiving mode (V.21) (S35). Then, the public telephone line 32 is connected and facsimile data reception is started (S37, S39).

Then, when facsimile data reception is finished, the public telephone line 32 is disconnected (S41), and the caller ID and the number of call signals stored in the RAM 14 are erased (S43), and then the process returns to S1. When caller ID is not stored in the RAM 14, only the number of call signals is erased.

When it is judged at S33 that the transmitted signal is not a CNG signal (S33: NO), the transmitted signal can be regarded as a conversation signal. Thus, the call signal is transmitted to the external telephone 3 and the handset 47 (S45), and the external telephone 3 and the handset 47 output a ring tone.

Next, it is judged whether the detected line voltage Vc is lower than the judging voltage Vt (S47). When the detected line voltage Vc is lower than the judging voltage Vt (S47: YES), indication of "External telephone is busy" is displayed on the LCD 5 (S49), and then it is judged whether conversation by using the external telephone 3 has been finished (S51, S53). Specifically, the line voltage of the public telephone line 32 is detected (S51), and it is judged whether the detected line voltage Vc is higher than the judging voltage Vt (S53).

Then, when it is judged that the detected line voltage Vc is higher than the judging voltage Vt (S53: YES), the conversation by the external telephone 3 is regarded as being finished, and the indication of "External telephone is busy" is turned off (S55). Further, the caller ID and the number of call signals stored in the RAM 14 are erased (S43), and then the process returns to S1.

When it is judged at S47 that the detected line voltage Vc is equal to or more than the judging voltage Vt (S47: NO), it is judged whether the handset 47 is hooked up based on a detection signal of the hook switch 48 (S57).

Herein, when it is judged that the handset 47 is hooked up (S57: YES), the modem 20 is set to a call mode (S59). Then, the public telephone line 32 is connected and conversation through the handset 47 becomes possible (S61, S63).

Then, it is judged whether conversation through the handset 47 has been finished, that is, whether the handset 47 has been hooked down (S65), and when it is judged that conversation through the handset 47 has been finished (S65: YES), the public telephone line 32 is disconnected (S67). Further, the caller ID and the number of call signals stored in the RAM 14 are erased (S43), and then the process returns to S1.

Figure 5:
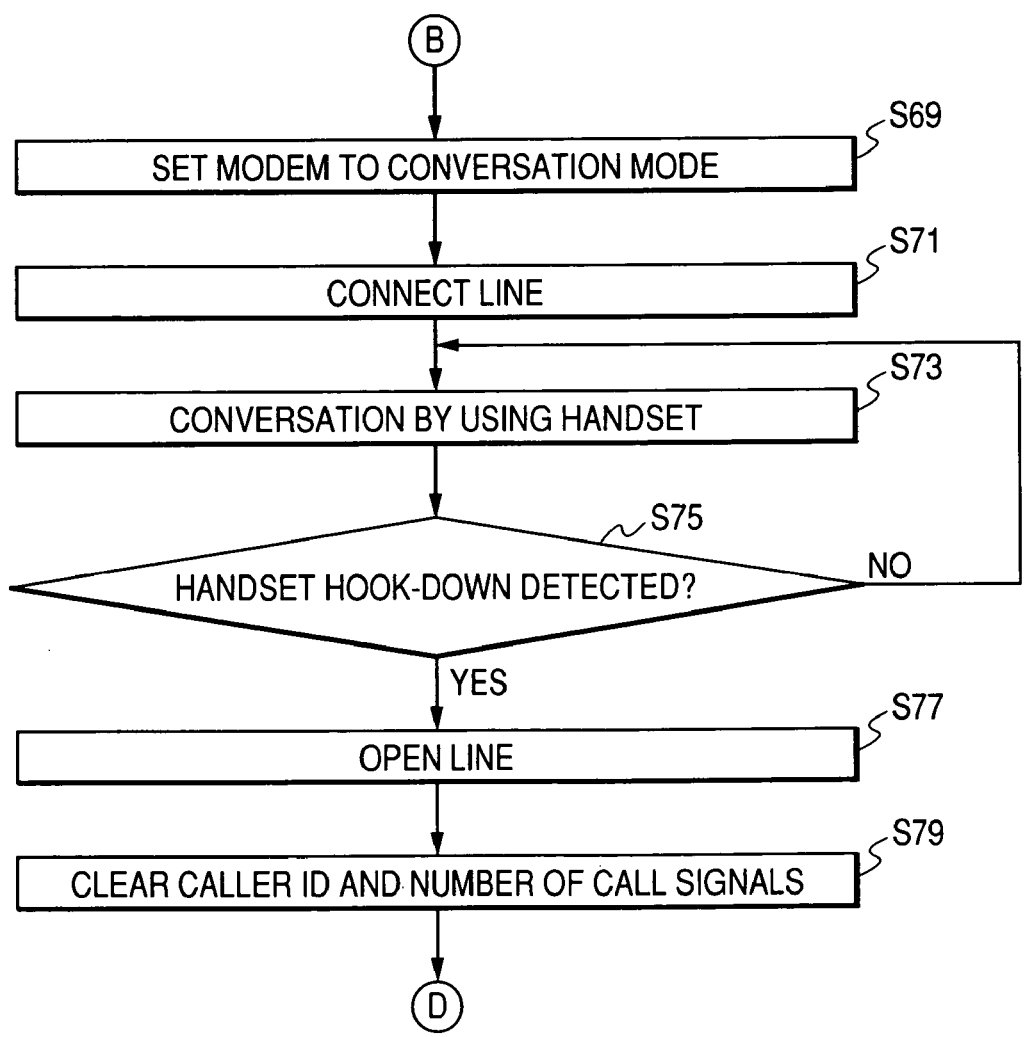
FIG. 5 is a flowchart showing characteristic operations of the facsimile apparatus according to the first aspect of the invention.

When it is judged at S23 (see FIG. 3) that the handset 47 is hooked up (S23: YES), as shown in FIG. 5, the modem 20 is set to a conversation mode (S69). Then, the public telephone line 32 is connected and conversation through the handset 47 becomes possible (S71, S73).

Then, it is judged whether conversation through the handset 47 has been finished, that is, whether the handset 47 has been hooked down (S75). When it is judged that conversation through the handset 47 has been finished (S75: YES), the public telephone line 32 is disconnected (S77). Further, the caller ID and the number of call signals stored in the RAM 14 are erased (S79), and then the process returns to S1. When caller ID is not stored in the RAM 14, only the number of call signals is erased.

Figure 6:
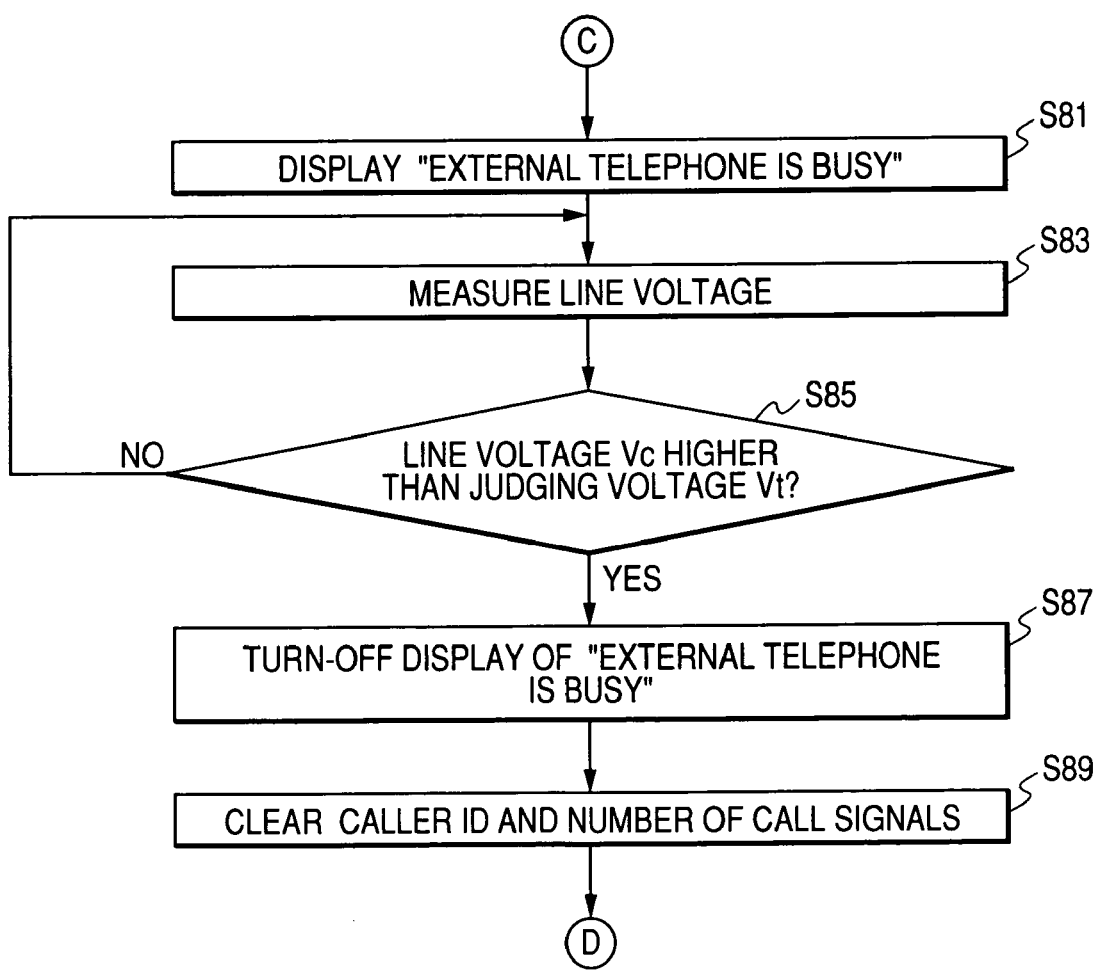
FIG. 6 is a flowchart showing characteristic operations of the facsimile apparatus according to the first aspect of the invention.
Figure 7:
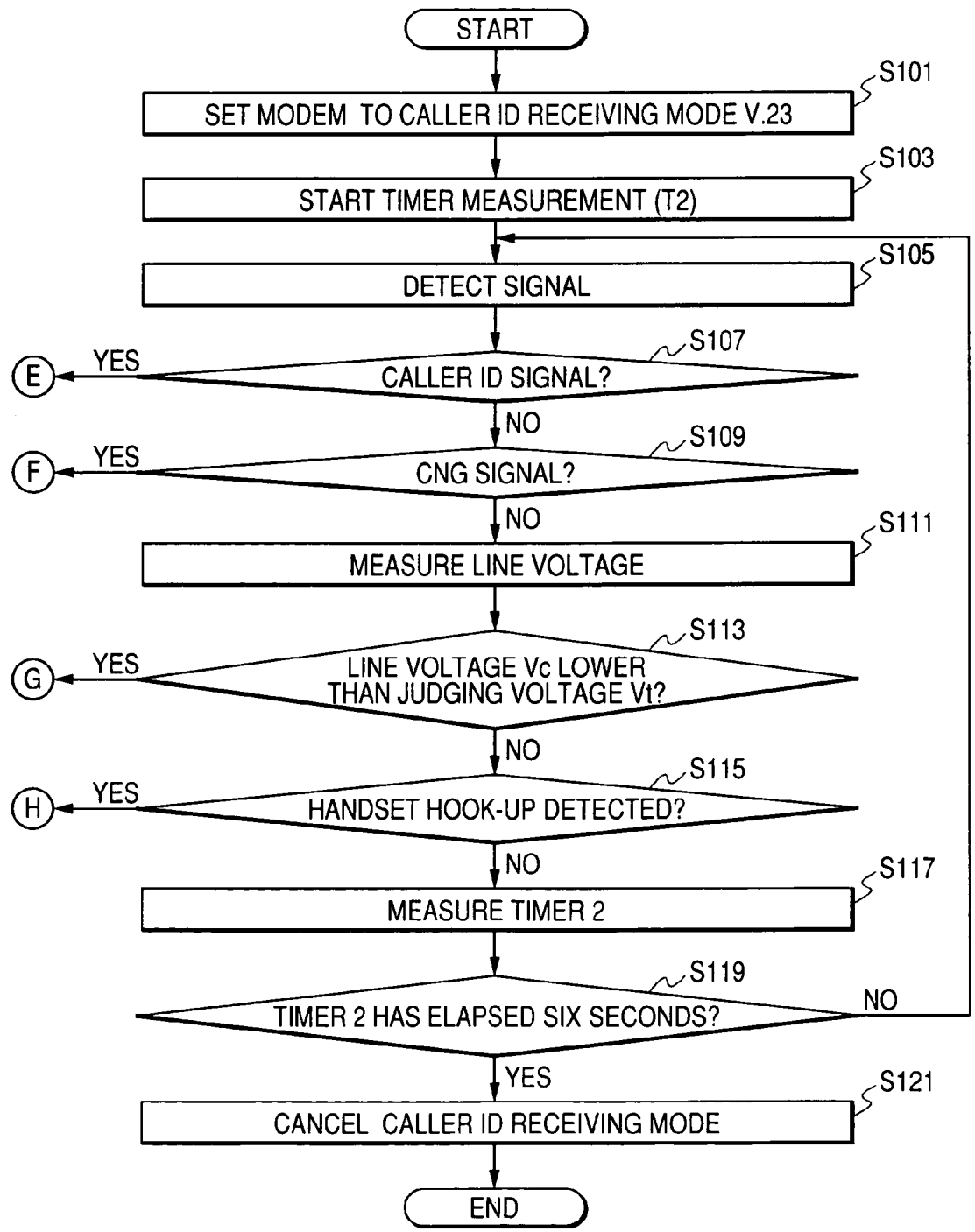
FIG. 7 is a flowchart showing characteristic operations of the facsimile apparatus according to the first aspect of the invention.

When it is judged at S27 (see FIG. 3) that the detected line voltage Vc is lower than the judging voltage Vt (S27: YES), as shown in FIG. 6, the indication of "External telephone is busy" is displayed on the LCD 5 (S81).

Then, it is judged whether conversation by using the external telephone 3 has been finished (S83, S85). Namely, the line voltage of the public telephone line 32 is detected (S83), and it is judged whether the detected line voltage Vc is higher than the judging voltage Vt (S85).

At this time, when it is judged that the detected line voltage Vc is higher than the judging voltage Vt (S85: YES), conversation by using the external telephone 3 is regarded as finished, and the indication of "External telephone is busy" is turned off (S87). Further, the caller ID and the number of call signals stored in the RAM 14 are erased (S89), and then the process returns to S1. When caller ID is not stored in the RAM 14, only the number of call signals is erased.

2.2 Processing for Acquiring Caller ID

FIG. 7 through FIG. 11 are flowcharts showing processing for caller ID acquisition, facsimile data reception or conversation (details of S31 of FIG. 3). When this control flow is started, first, the modem 20 is set to a caller ID receiving mode (V.23) (S101), and time measurement by the built-in timer (hereinafter, this time is referred to as an ID receiving time T2) is started (S103).

Next, a signal to be transmitted via the public telephone line 32 is detected (S105), and it is judged whether the detected signal is a signal indicating caller ID (S107). When it is judged the detected signal is not a signal indicating caller ID (S107: NO), it is judged whether the detected signal is a CNG signal (S109).

Then, when it is judged that the detected signal is not a CNG signal (S109: NO), the line voltage of the public telephone line 32 is detected (S111), and it is judged whether the detected line voltage Vc is lower than the judging voltage Vt (S113).

At this time, when it is judged that the detected line voltage Vc is equal to or more than the judging voltage Vt (S113: NO), it is judged whether the handset 47 is hooked up (S115). When it is judged that the handset 47 is not hooked up (S115: NO), the ID receiving time T2 is measured (S117), and it is judged whether the measured ID receiving time T2 has elapsed a predetermined time (in this aspect, six seconds) (S119).

Then, when it is judged that the measured ID receiving time T is less than the predetermined time (S119: NO), the process returns to S105, and the caller ID detecting flow is performed again. On the other hand, when it is judged that the measured ID receiving time T2 has elapsed the predetermined time (S121), the caller ID receiving mode is canceled (S121), and this control flow is ended.

Figure 8:
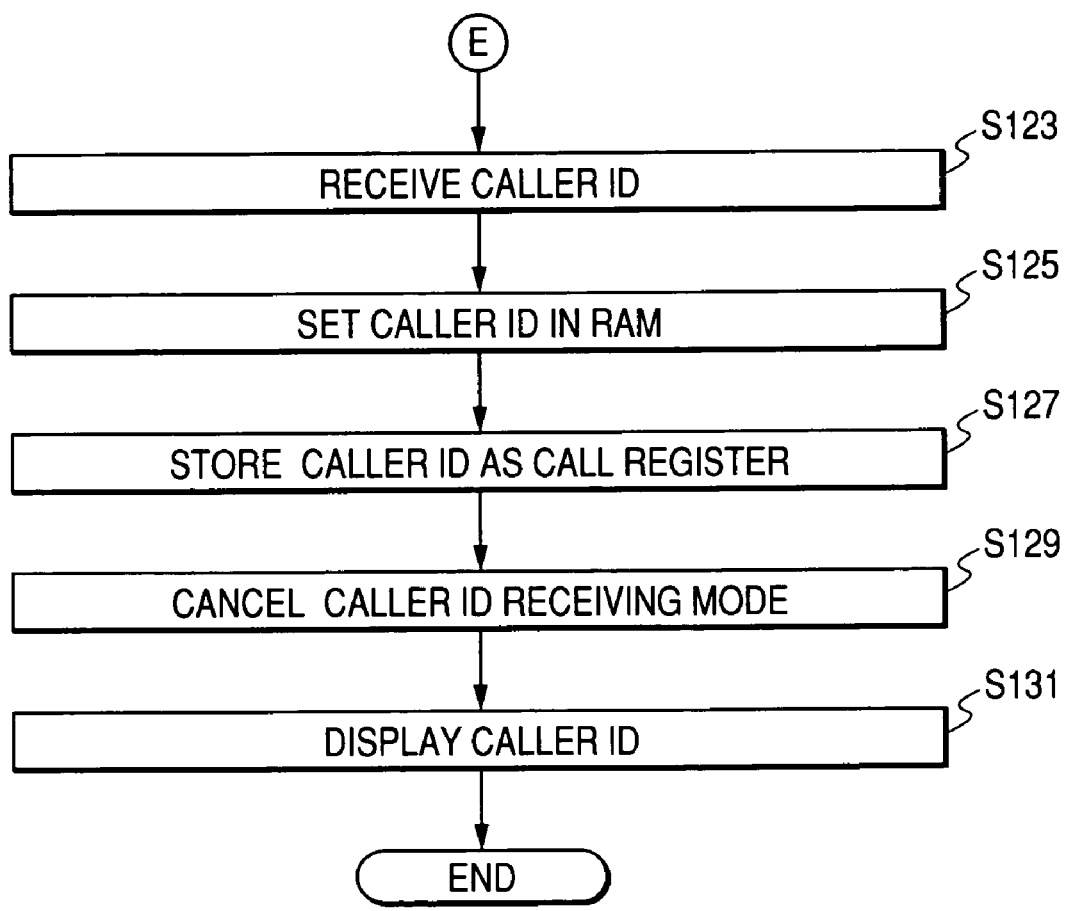
FIG. 8 is a flowchart showing characteristic operations of the facsimile apparatus according to the first aspect of the invention.

When the signal detected at S107 is judged as a signal indicating caller ID (S107: YES), as shown in FIG. 8, the caller ID is received (S123), and the received caller ID is stored in the RAM 14 (S125) and stored in the RAM 14 as a call register (S127).

Next, the caller ID receiving mode is canceled (S129), and the caller ID, that is, a source telephone number or source facsimile number, and a source name or appellation corresponding to the number are displayed on the LCD 5 (S131). Then this control flow ends.

Incidentally, in this aspect, a table showing the relationship between numbers and names or the like is stored in advance in the EEPROM 13. Based on this table and the received caller ID (source telephone number or source facsimile number), the source name or appellation is specified.

Figure 9:
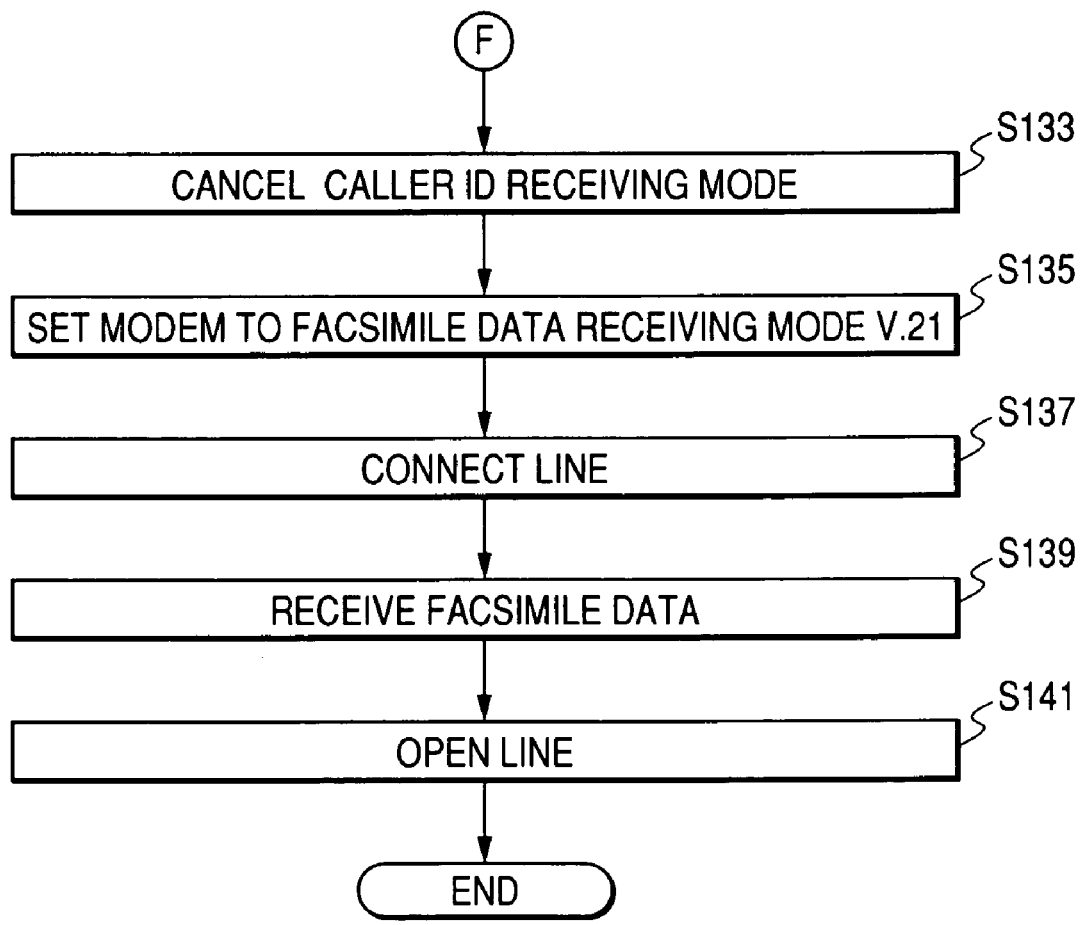
FIG. 9 is a flowchart showing characteristic operations of the facsimile apparatus according to the first aspect of the invention.

When the signal detected at S109 (see FIG. 7) is judged as a CNG signal (S109: YES), as shown in FIG. 9, the setting of the modem 20 is changed from the caller ID receiving mode to the facsimile data receiving mode (S133, S135). Then, the public telephone line 32 is connected and facsimiled at a reception is started (S137, S139).

Then, when facsimile data reception is finished, the public telephone line 32 is disconnected (S141). Then this control flow ends.

Figure 10:
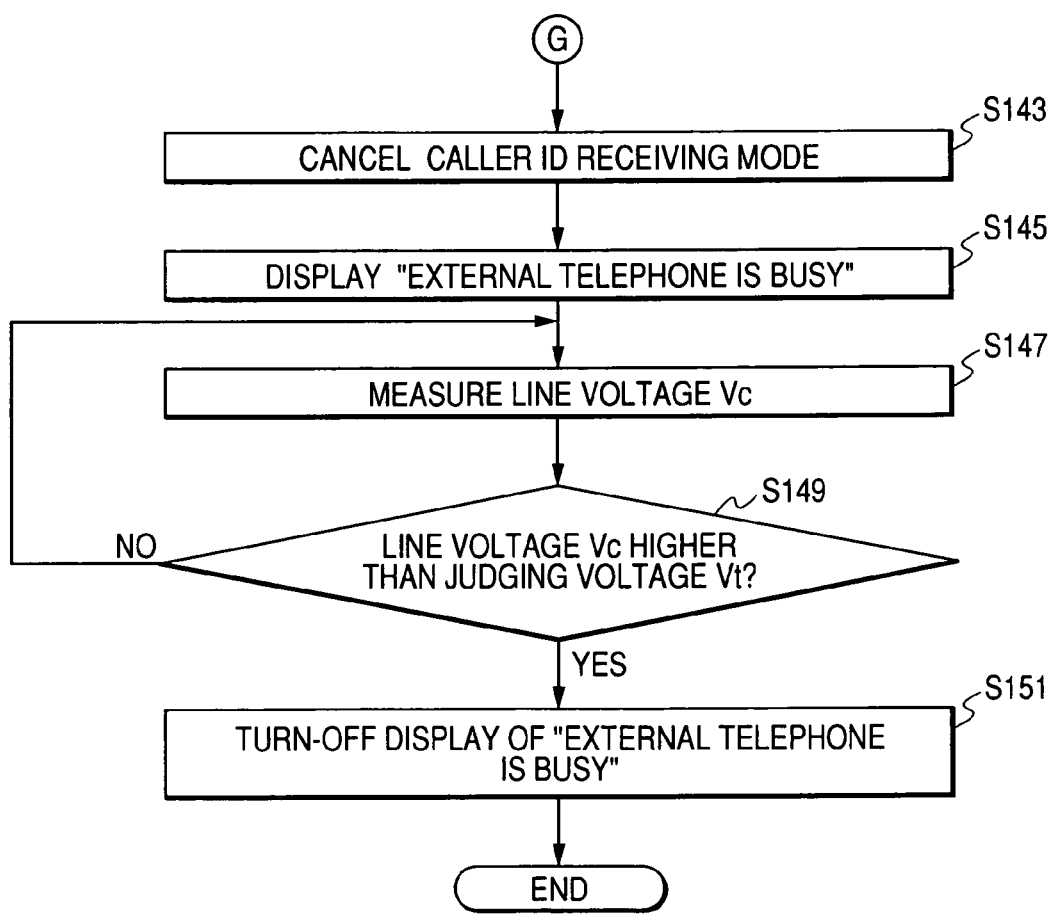
FIG. 10 is a flowchart showing characteristic operations of the facsimile apparatus according to the first aspect of the invention.

When the detected line voltage Vc is judged as being lower than the judging voltage Vt at S113 (see FIG. 7) (S113: YES), as shown in FIG. 10, the caller ID receiving mode is canceled (S143), and an indication of "External telephone is busy" is displayed on the LCD 5 (S145).

Then, it is judged whether conversation by using the external telephone 3 has been finished. That is, a line voltage of the public telephone line 32 is detected (S147), and it is judged whether this detected line voltage Vc is higher than the judging voltage Vt (S149).

At this time, when it is judged that the detected line voltage Vc is higher than the judging voltage Vt (S149: YES), it is regarded that the conversation through the external telephone 3 has been finished, and the indication "external telephone is busy" is turned off (S151). Then this control flow ends.

Figure 11:
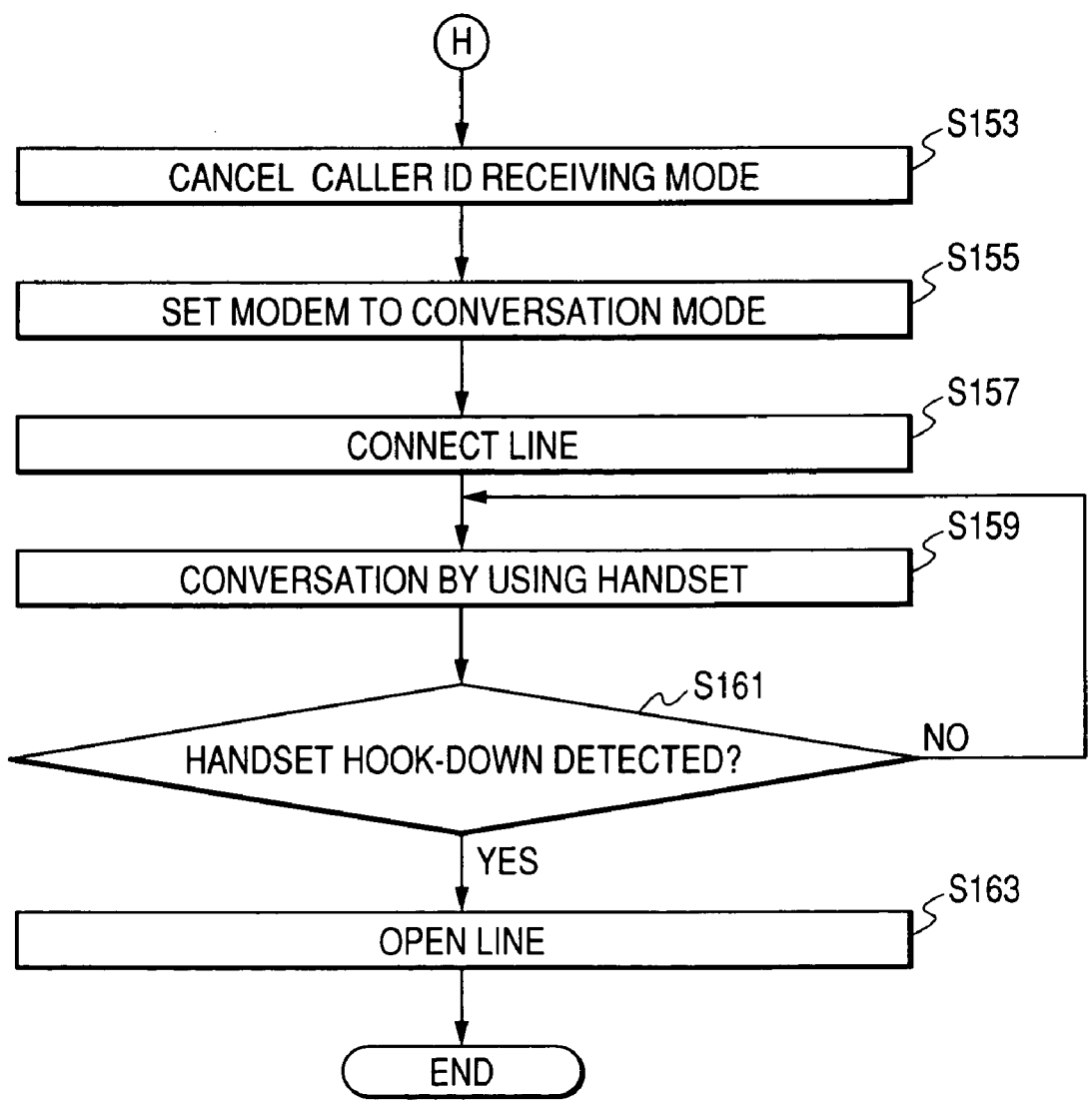
FIG. 11 is a flowchart showing characteristic operations of the facsimile apparatus according to the first aspect of the invention.

When it is judged at S115 (see FIG. 7) that the handset 47 has been hooked up (S115: YES), as shown in FIG. 11, the setting of the modem 20 is changed from the caller ID receiving mode to the conversation mode (S153, S155). Then, the public telephone line 32 is connected, and conversation by using the handset 47 is started (S157, S159).

Then, it is judged whether conversation by using the handset 47 has been finished, that is, whether the handset 47 has been hooked down (S161). When it is judged that conversation by using the handset 47 has been finished (S161: YES), the public telephone line 32 is disconnected (S63). Then this control flow ends.

As clearly understood from the flowchart shown in FIG. 3 through FIG. 11, in the facsimile apparatus according to this aspect, even when facsimile data is received or conversation is made by using the external telephone 3 or the handset 47 before the caller ID is detected, the caller ID detection is performed again after these actions are finished.

3. Characteristics of Facsimile Apparatus 1 of this Aspect

In the facsimile apparatus 1 according to this aspect, when call signals are detected and facsimile data reception or conversation by using the external telephone 3 or the handset 47 is not made, the caller ID is detected even after the second and later call signals are finished as well as after finish of the first call signal.

Therefore, even if the caller ID is not transmitted after a signal transmitted as the first call signal from the switchboard and caller ID is transmitted after the second or later call signal, the caller ID is detected. Thus, the caller ID can be detected even when the caller ID is transmitted after a second or later call signal.

Even when the duration of the first call signal transmitted from the switchboard is less than, for example, 500 milliseconds, or the frequency of the first call signal transmitted from the switchboard is less than 16 Hz and the first call signal cannot be detected by the facsimile apparatus 1, the caller ID can be detected if a caller ID signal is transmitted continuously from the second or later call signal. Therefore, even when the first call signal cannot be detected, caller ID can be detected.

Therefore, according to this aspect, source identification information can be detected regardless of the type of the switchboard.

In addition, in the facsimile apparatus 1 according to this aspect, when caller ID has already been detected, caller ID detection is not performed again, so that unnecessary control steps are not executed and the load of the CPU 11 can be prevented from unnecessarily increasing.

When the modem 20 is in the caller ID receiving mode, facsimile data cannot be received. However, in the facsimile apparatus 1 according to this aspect, when a CNG signal is detected, the modem 20 is set to a facsimile mode and facsimile data reception is prioritized, so that facsimile data can be received.

In this aspect, during detection of caller ID, when the line voltage (detected line voltage Vc) of the public telephone line 32 becomes lower than the judging voltage Vt, the caller ID receiving mode is canceled. Thus, even during detection of caller ID, conversation by using the external telephone 3 or a telephone connected to the public telephone line 32 parallel to the facsimile apparatus 1 can be made.

In addition, the handset 47 is connected via the modem 20, so that when the modem 20 is in the caller ID receiving mode, that is, when it detects the caller ID, conversation by using the handset 47 cannot be made. Therefore, conventionally, until a predetermined time (in this aspect, six seconds) elapses, since the modem 20 is changed to the caller ID receiving mode, conversation by using the handset 47 is impossible.

On the other hand, according to this aspect, when it is detected that the handset 47 has been hooked up, the caller ID receiving mode is canceled, and the mode is changed to the conversation mode. Thus, even before the predetermined time elapses, since the modem 20 is changed to the caller ID receiving mode, conversation by using the handset 47 is possible.

4. Correspondence Between the Aspect and the Invention Specific Matters Set Forth in Claims In this aspect, the ring detecting circuit 39 and S1 through S13 serve as the call signal detecting unit. The voltage detecting circuit 34 and S123 serve as the identification information detecting unit. The CPU 11 serves as the source identification information detection control unit. S23 serves as the facsimile signal detecting unit. The voltage detecting circuit 34 serves as the voltage detecting unit. S53 serves as the public line monitoring unit. The hook switch 48 serves as the hook state detecting unit. The LCD 5 serves as the source information display unit. S127 serves as the call register storing unit.

In addition, the conditions whether the signal transmitted via the public telephone line 32 is a CNG signal, whether the handset 47 is in a hook-up state, and whether the detected line voltage Vc is lower than the judging voltage Vt are examples of the predetermined conditions set forth in the claims.

The case where the signal transmitted via the public telephone line 32 is not a CNG signal, the handset 47 is in a hook-down state, and the detected line voltage Vc is equal to or more than the judging voltage Vt corresponds to the case where the predetermined condition is satisfied. The case where the signal transmitted via the public telephone line 32 is a CNG signal, the handset 47 is in a hook-up state, and the detected line voltage Vc is lower than the judging voltage Vt corresponds to the case where the predetermined condition is not satisfied.

To realize this aspect by a program (software), the ring detecting circuit 39 serving as the call signal detecting unit for detecting call signals transmitted via the public telephone line and the modem 20 serving as the identification information detecting unit for detecting source identification information transmitted via the public telephone line are controlled by the CPU 11 serving as a computer.

In this case, S1 through S13 correspond to the call signal judging unit, S21 through S27 correspond to the condition judging unit, and S31 corresponds to the source identification information detection control unit.

(Second Aspect)

According to this aspect, in the facsimile apparatus 1 according to the first aspect, the setting of the modem 20 is set to a facsimile data receiving mode when the detected line voltage Vc is judged as lower than the judging voltage Vt (S47), that is, when it is judged that the public telephone line 32 is connected by the external telephone 3.

Hereinafter, characteristic control operations of the facsimile apparatus 1 according to this aspect will be described. This aspect is the same as the first aspect except for the flowchart of FIG. 4 in the flowchart (FIG. 3 through FIG. 11) of the first aspect. Thus, only the difference from the first aspect will be described.

Figure 12:
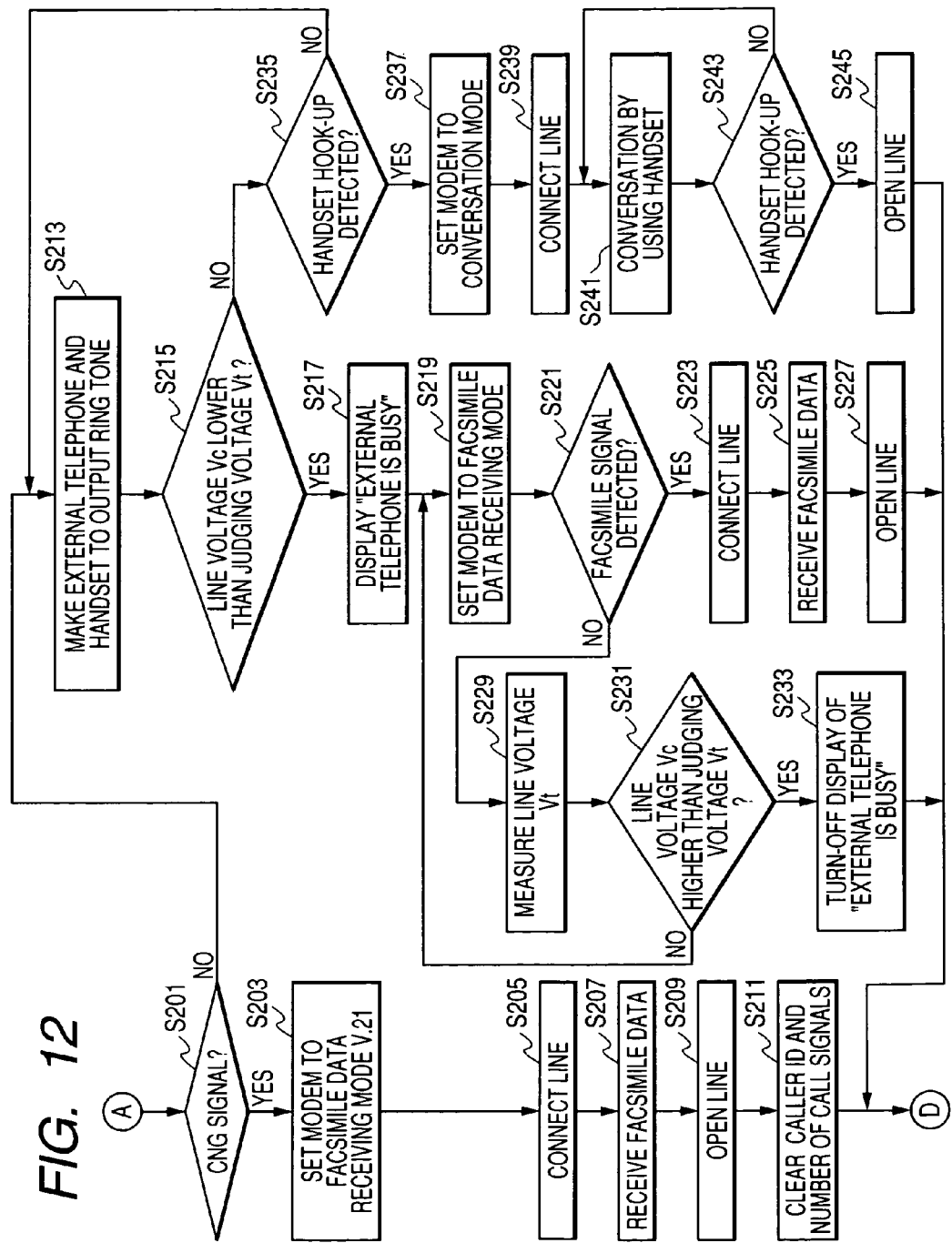
FIG. 12 is a flowchart showing characteristic operations of the facsimile apparatus 1 according to the second aspect of the invention.

FIG. 12 is a flowchart corresponding to FIG. 4 of this aspect, and when it is judged that the number of call signals is equal to or more than a predetermined number at S21 (see FIG. 3) (S21: YES), it is judged whether the transmitted signal is a CNG signal (S201).

At this time, when the transmitted signal is judged as a CNG signal (S201: YES), the setting of the modem 20 is set to the facsimile data receiving mode (V.21) (S203), and then the public telephone line 32 is connected and receiving of facsimile data is started (S205, S207).

Then, when facsimile data reception is finished, the public telephone line 32 is disconnected (S209) and the caller ID and the number of call signals stored in the RAM 14 are erased (S211), and thereafter, the process returns to S21. When caller ID is not stored in the RAM 14, only the number of call signals is erased.

When it is judged that the transmitted signal is not CNG signal at S201 (S201: NO), the transmitted signal can be regarded as a conversation signal, so that the call signal is transmitted to the external telephone 3 and the handset 47 (S213), and the external telephone 3 and the handset 47 output a ring tone.

Next, it is judged whether the detected line voltage Vc is lower than the judging voltage Vt (S215), and when the detected line voltage Vc is lower than the judging voltage Vt (S215: YES), indication of "External telephone is busy" is displayed on the LCD 5 (S217), and the setting of the modem 20 is set to the facsimile data receiving mode (S219).

Then, monitoring of a CNG signal, that is, facsimile signal is started (S221), and when a CNG signal is detected (S221: YES), the public telephone line 32 is connected and facsimile data reception is started (S223, S225). At this time, facsimile data reception and conversation by using the external telephone 3 are performed simultaneously, so that a person who has conversation through the external telephone 3 can be informed that facsimile data is being received.

When facsimile data reception is finished, the public telephone line 32 is disconnected (S209) and the caller ID and the number of call signals stored in the RAM 14 are erased (S227). Then the process returns to S21.

On the other hand, when a CNG signal is not detected at S221 (S221: NO), it is judged whether conversation by using the external telephone 3 has been finished (S229, S231). In detail, the line voltage of the public telephone line 32 is detected (S229), and it is judged whether the detected line voltage Vc is higher than the judging voltage Vt (S231).

Then, when the detected line voltage Vc is judged as higher than the judging voltage Vt (S231: YES), it is regarded that conversation by using the external telephone 3 has been finished. The indication of "External telephone is busy" is turned off (S233), and the caller ID and the number of call signals stored in the RAM 14 are erased (S221). Then the process returns to S21.

When the detected line voltage Vc is judged as equal to or more than the judging voltage Vt at S215 (S215: NO), based on a detection signal of the hook switch 48, it is judged whether the handset 47 has been hooked up (S235).

Herein, when the handset 47 is judged as being hooked up (S235: YES), the modem 20 is set to the conversation mode (S237), and then the public telephone line 32 is connected and conversation by using the handset 47 becomes possible (S239, S241).

Then, it is judged whether conversation by using the handset 47 has been finished, that is, whether the handset 47 has been hooked down (S243). When it is judged that the conversation by using the handset 47 has been finished (S243: YES), the public telephone line 32 is disconnected (S245), and the caller ID and the number of call signals stored in the RAM 14 are erased (S211) Then the process returns to S21.

Next, the characteristics of the facsimile apparatus 1 according to this aspect will be described.

When the public telephone line 32 is judged as connected by the external telephone 3, the setting of the modem 20 is set to the facsimile data receiving mode, so that even when facsimile data is transmitted during conversation with another telephone connected to the public telephone line 32 of the external telephone 3 or the like parallel to the facsimile apparatus 1, the facsimile apparatus can receive the facsimile data immediately.

As clearly understood from the description given above, in this aspect, S219 corresponds to the facsimile mode switch means set forth in the claims.

(Other Aspects)

In addition, in the aspects described above, the facsimile apparatus 1 has external telephone terminals T1 and T2 for connecting the external telephone 3. However, the invention is not limited to this, and the invention is also applicable to a facsimile apparatus that does not have external telephone terminals T1 and T2 and distributes the public telephone line 3 by using an external distributor or the like.

In the above-described aspects, the facsimile apparatus 1 has the handset 47. However, the invention is also applicable to a facsimile apparatus that does not have the handset 47.

In the above-described aspects, information (number and name, etc.) relating to the source is displayed on the LCD 5. However, the invention is not limited to this, and it is also allowed that information on the source is notified to a user by means of, for example, voices.

In the above-described aspect, call registers are stored in the RAM 14. However, the invention is not limited to this, and it is also allowed that storing of call registers is abolished, or call registers are stored in a storage device other than the RAM 14.

In the above-described aspect, the judging voltage Vt is smaller than the reference voltage of the line voltage in a disconnected state of the telephone line 31 and has a predetermined difference of ΔV or more from the reference voltage. However, the invention is not limited to this, and contrary to this, it is also possible that, for example, the judging voltage Vt is set so as to be higher than the reference voltage and has a predetermined difference of DV or more from the reference voltage.

In the above-described aspect, the table showing the relationship between numbers and names is stored in advance in the EEPROM 13. Based on this table and received caller ID (source telephone number or source facsimile number), the source name or appellation is specified. However, the invention is not limited to this.

In addition, the invention is not limited to the above-described aspects as long as it is consistent with the spirit of the invention.

What is claimed is:

1. A telephone apparatus comprising:
   a first call signal detecting unit that detects a signal transmitted via a public telephone line as a first call signal if the signal has a predetermined frequency and continues for a predetermined time period;
   an identification information acquiring unit that executes an acquiring operation of acquiring source identification information for the signal transmitted via the public telephone line;
   a source identification information acquisition control unit that controls the acquiring operation of the identification information acquiring unit; and
   a determining unit that determines whether the identification information acquiring unit has acquired the source identification information,
   wherein when the first call signal detecting unit detects the first call signal, the source identification information acquisition control unit controls the identification information acquiring unit to execute the acquiring operation for the signal transmitted via the public telephone line after the first call signal if the determining unit determines that the identification information acquiring unit has not acquired the source identification information, and does not control the identification information acquiring unit to execute the acquiring operation for the signal transmitted via the public telephone line after the first call signal if the determining unit determines that the identification information acquiring unit has acquired the source identification information.

2. The telephone apparatus according to claim 1, further comprising a facsimile signal detecting unit that detects a facsimile signal,
   wherein when the first call signal detecting unit detects the first call signal, the source identification information acquisition control unit does not control the identification information acquiring unit to execute the acquiring operation if the facsimile signal is detected by the facsimile signal detecting unit.

3. The telephone apparatus according to claim 1, further comprising:
   a voltage detecting unit that detects a line voltage of the public telephone line; and
   a public line monitoring unit that judges whether the public telephone line is connected based on a voltage difference between a voltage detected by the voltage detecting unit and a reference voltage,
   wherein when the first call signal detecting unit detects the first call signal, the source identification information acquisition control unit does not control the identification information acquiring unit to execute the acquiring operation if the public line monitoring unit judges that the public telephone line is connected.

4. The telephone apparatus according to claim 3, further comprising a facsimile mode switch unit that establishes a facsimile data receivable state when the public line monitoring unit judges that the public telephone line is connected.

5. The telephone apparatus according to claim 1, further comprising a hook state detecting unit that detects whether the handset has been lifted,
   wherein, the source identification information acquisition control unit does not control the identification information detecting unit to execute the acquiring operation if the hook state detecting unit judges that the handset has been lifted.

6. The telephone apparatus according to claim 1, further comprising a source information display unit that displays source information based on the source identification information acquired by the source identification information acquisition control unit.

7. The telephone apparatus according to claim 1, further comprising a call register storing unit that stores a call register based on the source identification information acquired by the source identification information acquisition control unit.

8. The telephone apparatus according to claim 1, further comprising:

a storage unit that stores the source identification information acquired by the identification information acquiring unit, wherein the determining unit determines whether the identification information acquiring unit has acquired the source identification information based on whether the storage unit stores the source identification information.

9. A program product for enabling a computer of a telephone apparatus including a first call signal detecting unit that detects a signal transmitted via a public telephone line as a first call signal if the signal has a predetermined frequency and continues for a predetermined time period and an identification information acquiring unit that executes an acquiring operation of acquiring source identification information for the signal transmitted via the public telephone line, to perform predetermined operations as an identification information acquisition control device for controlling an operation of the identification information acquiring unit, the operations comprising:

judging whether the first call signal is detected by the first call signal detecting unit;

judging whether the identification information acquiring unit has acquired the source identification information; and when it is judged that the first call signal is detected, controlling the identification information acquiring unit to execute the acquiring operation for the signal transmitted via the public telephone line after the first call signal if it is judged that the identification information acquiring unit has not acquired the source identification information, and not controlling the identification information acquiring unit to execute the acquiring operation for the signal transmitted via the public telephone line after the first call signal if it is judged that the identification acquiring unit has not acquired the source identification information.

* * * * *